US012241301B2

(12) United States Patent
Lee et al.

(10) Patent No.: US 12,241,301 B2
(45) Date of Patent: Mar. 4, 2025

(54) DOOR OPENING AND CLOSING DEVICE FOR VEHICLE

(71) Applicants: Hyundai Motor Company, Seoul (KR); Kia Corporation, Seoul (KR)

(72) Inventors: Jaeseung Lee, Hwaseong-Si (KR); Gookhyun Jeon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/379,922

(22) Filed: Oct. 13, 2023

(65) Prior Publication Data

US 2024/0175310 A1 May 30, 2024

(30) Foreign Application Priority Data

Nov. 29, 2022 (KR) ........................ 10-2022-0162698

(51) Int. Cl.
*E05F 15/652* (2015.01)
*E05F 15/638* (2015.01)
*E05F 15/649* (2015.01)
*E05F 15/655* (2015.01)

(52) U.S. Cl.
CPC .......... *E05F 15/652* (2015.01); *E05F 15/638* (2015.01); *E05F 15/649* (2015.01); *E05F 15/655* (2015.01); *E05Y 2201/624* (2013.01); *E05Y 2201/702* (2013.01); *E05Y 2900/512* (2013.01)

(58) Field of Classification Search
CPC ..... E05F 15/652; E05F 15/638; E05F 15/649; E05F 15/655; E05Y 2201/624; E05Y 2201/702; E05Y 2201/62; E05Y 2201/404; E05Y 2201/406; E05Y 2201/70; E05Y 2201/71; E05Y 2900/512; E05Y 2900/531; E05Y 2800/102; E05Y 2800/73; E05D 15/101
USPC .......... 49/116, 117, 118, 360, 362, 209, 210, 49/211, 216, 218
See application file for complete search history.

(56) References Cited

U.S. PATENT DOCUMENTS 4,091,570 A * 5/1978 Favrel .................. E05F 15/652 49/362
5,253,452 A * 10/1993 Goldbach ............ B61D 19/009 49/128
5,341,598 A * 8/1994 Reddy ..................... E05F 15/40 49/362
5,893,236 A * 4/1999 Krbec ................. E05D 15/1068 49/210
6,094,867 A * 8/2000 Reddy .................... B61D 19/02 49/280
6,134,838 A * 10/2000 Reddy ................. E05D 15/0652 49/362
6,385,910 B1 * 5/2002 Smink ................. E05D 15/1068 49/213

(Continued)

*Primary Examiner* — Jerry E Redman
(74) *Attorney, Agent, or Firm* — Morgan, Lewis & Bockius LLP

(57) ABSTRACT

A door opening and closing device for a vehicle includes a door for opening and closing a door opening formed in a vehicle body, a spindle mounted in a longitudinal direction of the vehicle body and configured to rotate, and a door arm of which a first end portion thereof is rotatably connected to a first end portion of the door, and a second end portion may be configured to move and rotate according to a rotation of the spindle.

11 Claims, 12 Drawing Sheets

(56) References Cited

U.S. PATENT DOCUMENTS

| | | | | |
|---|---|---|---|---|
| 6,446,389 | B1 * | 9/2002 | Heffner | E05F 15/652 49/118 |
| 6,640,388 | B2 * | 11/2003 | Covert | B61D 19/02 16/93 R |
| 6,718,694 | B2 * | 4/2004 | Stojc | E05F 15/652 49/362 |
| 8,661,731 | B2 * | 3/2014 | Lee | E05F 15/655 49/118 |
| 8,661,732 | B2 * | 3/2014 | Kong | E05B 83/363 49/362 |
| 8,661,733 | B2 * | 3/2014 | Lee | E05B 83/363 49/362 |
| 10,633,908 | B1 * | 4/2020 | Loeb | E05D 15/1002 |
| 10,876,341 | B2 * | 12/2020 | Taylor | E05F 15/41 |
| 10,994,752 | B2 * | 5/2021 | Stojc | B61D 19/02 |
| 12,000,186 | B1 * | 6/2024 | Mapson | E05D 15/101 |
| 2002/0194783 | A1 * | 12/2002 | Stojc | E05F 15/635 74/89.36 |
| 2012/0011778 | A1 * | 1/2012 | Kong | E05B 83/363 70/91 |
| 2012/0073208 | A1 * | 3/2012 | Lee | E05F 15/655 49/449 |
| 2013/0298706 | A1 * | 11/2013 | Linnenkohl | B60J 5/06 74/89 |
| 2016/0129769 | A1 * | 5/2016 | Choi | E05B 85/24 49/159 |
| 2024/0175310 | A1 * | 5/2024 | Lee | E05F 15/649 |

* cited by examiner

D - D

E - E

F - F

G - G

DOOR OPENING AND CLOSING DEVICE FOR VEHICLE

CROSS-REFERENCE TO RELATED APPLICATION

The present application claims priority to Korean Patent Application No. 10-2022-0162698 filed on Nov. 29, 2022, the entire contents of which is incorporated herein for all purposes by this reference.

BACKGROUND OF THE PRESENT DISCLOSURE

Field of the Present Disclosure

The present disclosure relates to a door opening and closing device for a vehicle. More particularly, the present disclosure relates to, for a vehicle without a B-pillar, a bidirectional door opening and closing device for a vehicle configured for opening and closing a door opening of a vehicle body by sliding and rotating the vehicle doors in both directions of forward and rearward directions.

Description of Related Art

In general, a vehicle door is a door that separates the interior and exterior of a vehicle, and has an important function of blocking external noise, rain, dust, wind, etc., and absorbing shock with side structures in case of a side collision to safely protect occupants.

There are various types of vehicle doors, including special-purpose doors, but hinge-type swing doors are most often applied to passenger vehicles.

In general, a swing door refers to a door that opens to the outside of the vehicle body around a hinge axis installed through a hinge bracket between the door and the vehicle body, and has the advantage of being easy to open or close, and easy to maintain and repair due to a simple structure.

On the other hand, some vehicles are applied with an opposing swing door which is advantages in that a large sense of openness may be obtained when the door is opened and it is easy for passengers to get on or off. The opposing swing door is opened or closed by use of rotation of an arm connected to the vehicle body and the door.

By the way, although such an opposing swing door has the advantage of a large door opening and closing amount, there is a problem in that the protruding amount to the outside of the vehicle is excessive due to the length of the arm when the door is opened. As shown in FIG. 1C, a first end of an arm 3 is rotatably fixed to the fixing point A of the vehicle body 1, and when the arm 3 rotates and the door 2 changes from a closed state of FIG. 1A to an open state of FIG. 1B, the movement amount by which the door 2 protrudes outwardly from the body 1 becomes large due to the length of the arm 3, which deteriorates the appearance of the vehicle and causes inconvenience in terms of use.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to maximizing door opening width by sliding and rotating the vehicle doors in both directions of forward and rearward directions, and at the same time, minimizing a protrusion amount of the vehicle door toward the outside of the vehicle body when the door is opened by minimizing a door rotation radius.

A door opening and closing device for a vehicle includes a door for opening and closing a door opening formed in a vehicle body, a spindle mounted in a longitudinal direction of the vehicle body and configured to rotate, and a door arm of which a first end portion is rotatably connected to a first end portion of the door, and a second end portion may be configured to move and rotate according to a rotation of the spindle.

A first end portion of the door arm may be rotatably connected to a door bracket provided in the door, and a second end portion of the door arm may be rotatably connected to a nut bracket provided in the spindle and configured to move along the spindle in the longitudinal direction of the vehicle body according to the rotation of the spindle.

The first end portion of the door arm may be hingedly connected to the door bracket by a door pin, and the second end portion of the door arm may be hingedly connected to the nut bracket by a nut pin.

The door arm may include a first door arm and a second door arm that are disposed apart from and in parallel to each other in the longitudinal direction of the vehicle body.

A second end portion of the first door arm may be provided with a first nut bracket coupled to the spindle and configured to move along the spindle in the longitudinal direction of the vehicle body according to the rotation of the spindle, a worm gear provided in the first nut bracket and being in contact with an external circumference of the spindle to rotate according to the rotation of the spindle, and a worm wheel gear rotatably mounted on the first nut bracket, connected to the second end portion of the first door arm, and being in contact with a surface of the worm gear to rotate according to a rotation of the worm gear to rotate the second end portion of the first door arm.

The second end portion of the first door arm may be located between the first nut bracket and the worm wheel gear, and the worm gear may be located between the spindle and the worm wheel gear.

A second end portion of the second door arm may be provided with a second nut bracket coupled to the spindle and configured to move along the spindle in the longitudinal direction of the vehicle body according to the rotation of the spindle.

A second end portion of the second door arm may maintain a predetermined interval with respect to a second end portion of the first door arm and may be configured to move in the longitudinal direction of the vehicle body, and the second door arm may be rotated according to a rotation of the first door arm by a same rotation radius with the first door arm.

The spindle may be connected to a center shaft of a motor provided in the vehicle body and configured to rotate according to driving of the motor.

The door may include a front door configured to rotate and linearly move toward a front of the vehicle body, and a rear door configured to rotate and linearly move toward a rear of the vehicle body, and each of the front door and the rear door may be provided with the spindle and the door arm.

According to an exemplary embodiment of the present disclosure, by employing a door structure opening and closing the door opening by simultaneously performing sliding and rotation, a protrusion amount of the vehicle door toward the outside of the vehicle body may be minimized while maximizing the door opening width, when the door is opened by minimizing a door rotation radius.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
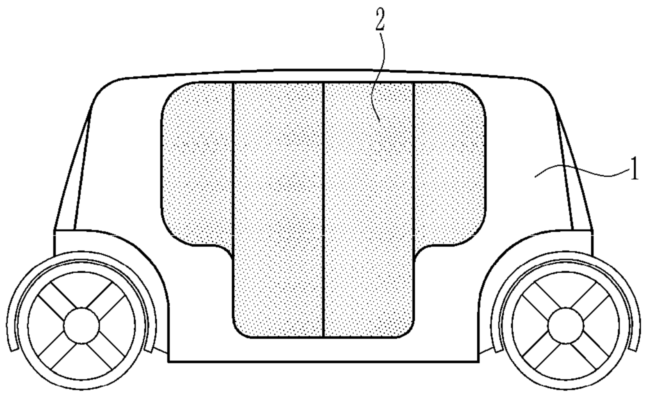
FIG. 1A, FIG. 1B and FIG. 1C schematically illustrate operations of a bidirectional swing door of a conventional vehicle.
Figure 1B:
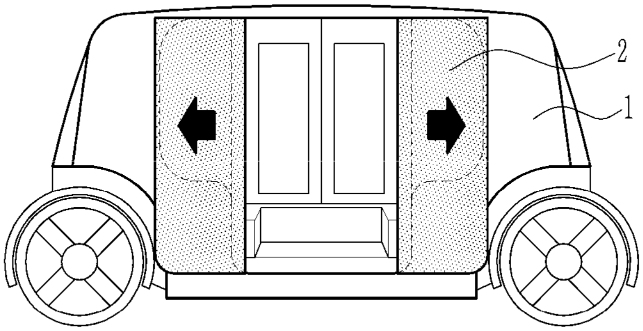
Figure 1C:
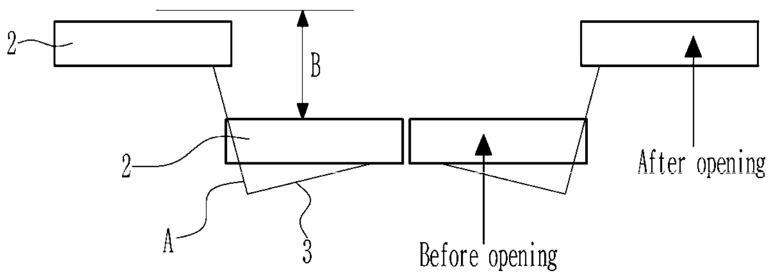

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, with embodiments of the present disclosure, detailed description is made of as to the constituent elements in various exemplary embodiments with reference to the relevant drawings by use of the same reference numerals for the same constituent elements, while only the constituent elements different from those related to the various exemplary embodiments are described in other exemplary embodiments of the present disclosure.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present disclosure shows various exemplary embodiments of the present disclosure in detail. As a result, various modifications of the drawings will be expected. Therefore, the exemplary embodiments are not limited to a specific shape of an illustrated region, but, for example, include a change in the shape in accordance with manufacturing.

Hereinafter, a door opening and closing device for a vehicle according to an exemplary embodiment of the present disclosure is described in detail with reference to the drawings.

Figure 2:
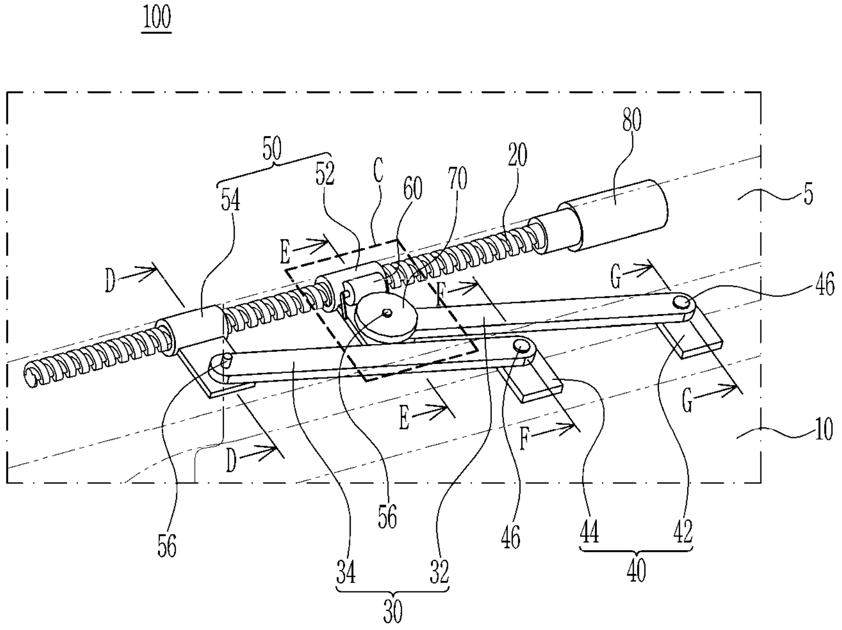
FIG. 2 schematically illustrates a door closed state of a door opening and closing device for a vehicle according to an exemplary embodiment of the present disclosure.
Figure 3:
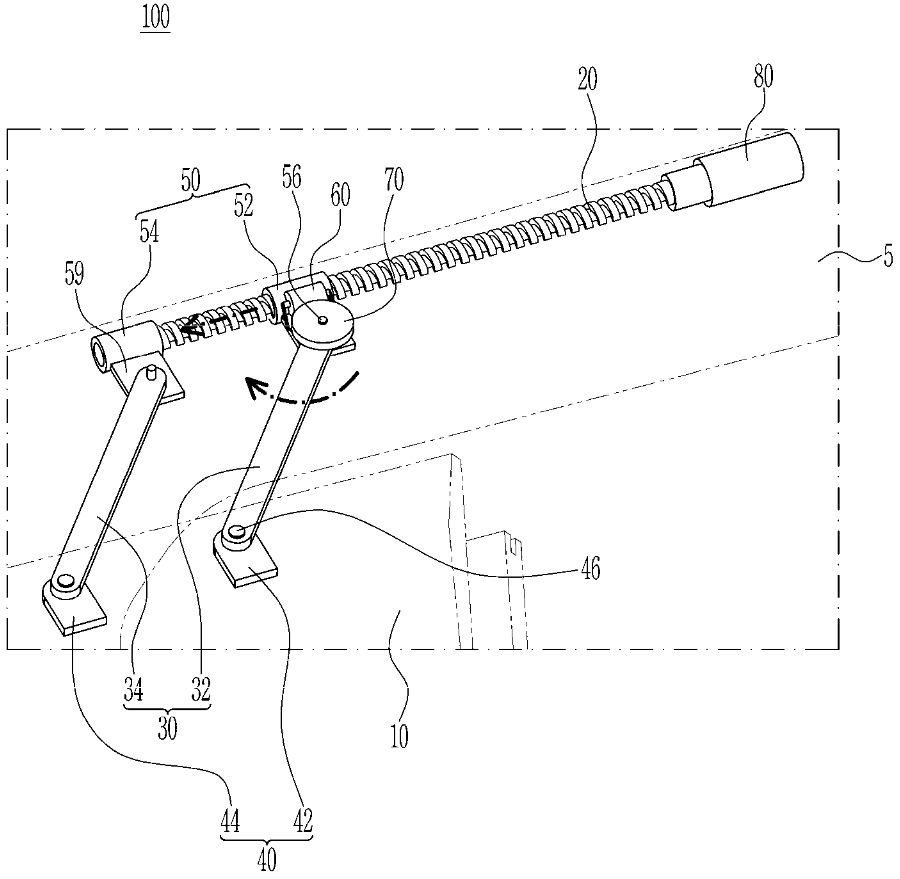
FIG. 3 schematically illustrates a door opened state of a door opening and closing device for a vehicle according to an exemplary embodiment of the present disclosure.
Figure 4:
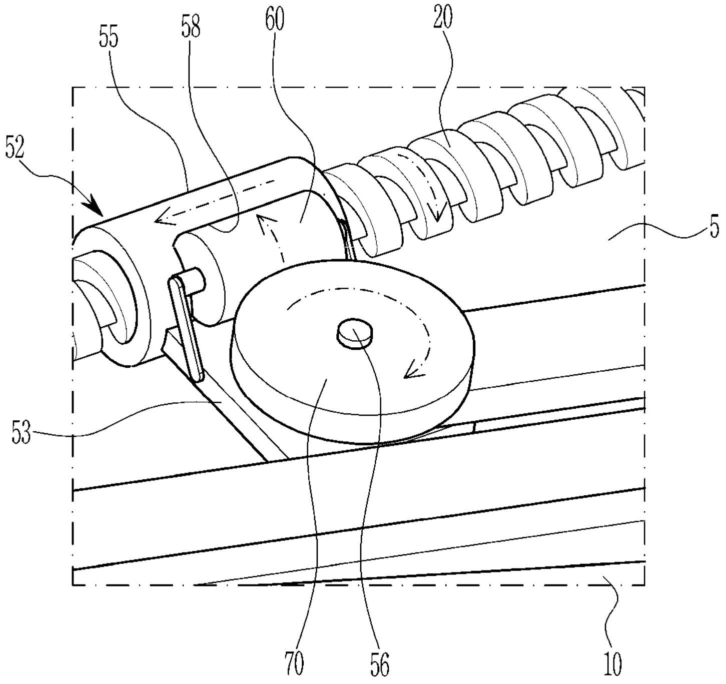
FIG. 4 is an enlarged view of a portion C in FIG. 2.

FIG. 2 schematically illustrates a door closed state of a door opening and closing device for a vehicle according to an exemplary embodiment of the present disclosure. FIG. 3 schematically illustrates a door opened state of a door opening and closing device for a vehicle according to an exemplary embodiment of the present disclosure. FIG. 4 is an enlarged view of a portion C in FIG. 2.

Referring to FIG. 2 and FIG. 3, a door opening and closing device for a vehicle according to an exemplary embodiment 100 includes a door 10, a spindle 20, and a door arm 30.

The door 10 is configured to open or close a door opening formed in a vehicle body 5 of the vehicle, and the door arm 30 is connected to the door 10 and the vehicle body 5.

The spindle 20 may be formed in a longitudinal direction of the vehicle body 5 and configured to rotate. An end portion of the spindle 20 is connected to a center shaft of an actuator such as a motor 80 provided in the vehicle body 5, and may be rotated according to driving of the motor 80. Adjustment of rotation speed and rotation amount of the spindle 20 may be achieved by adjusting the rotation speed and rotation amount of the motor 80.

A first end portion of the door arm 30 may be rotatably connected to a first end portion of the door 10, and a second end portion thereof may be connected to the spindle 20. The first end portion of the door 10 may be fixedly provided with a door bracket 40, and the first end portion of the door arm 30 may be rotatably connected to the door bracket 40. Furthermore, the first end portion of the door arm 30 may be hinge-rotatably connected to the door bracket 40 by a door pin 46.

A nut bracket 50 is coupled to the spindle 20 to the surround an external circumference of the spindle 20, and configured to move in the longitudinal direction of the vehicle body 5 according to a rotation of the spindle 20. A second end portion of the door arm 30 may be rotatably connected to the nut bracket 50. Furthermore, the second end portion of the door arm 30 may be hinge-rotatably connected to the nut bracket 50 by a nut pin 56.

Meanwhile, the door arm 30 may include a first door arm 32 and a second door arm 34 that are disposed apart from and in parallel to each other in the longitudinal direction of the vehicle body 5. Furthermore, corresponding to the first door arm 32 and the second door arm 34, respectively, a first door bracket 42 and a second door bracket 44 may be provided on a first end side of the door 10 connected to the first end portion of the door arm 30. Furthermore, a first nut bracket 52 and a second nut bracket 54 may be provided on a side of the spindle 20 connected to the second end portion of the door arm 30.

The first nut bracket 52, a worm gear 60, and a worm wheel gear 70 may be provided to a second end portion of the first door arm 32. The first nut bracket 52 may move in the longitudinal direction of the vehicle body 5 according to the rotation of the spindle 20. The first nut bracket 52 may include a planar portion 53 where a lower portion of the second end portion of the door arm 30 is accommodated and a gripping portion 56 surrounding the external circumference of the spindle 20 and configured to move along the spindle 20. Furthermore, a gripping portion 56 of the first nut bracket 52 may be formed with an opening 58 through which the worm gear 60 passes so that the worm gear 60 may be in contact with the spindle 20.

The worm gear 60 is provided on a planar portion 53 of the first nut bracket 52, and a surface of the worm gear 60 passes through the opening 58 formed in a gripping portion 56 of first nut bracket 52 to be in contact with the external circumference of the spindle 20. Therefore, when the spindle 20 is rotated, the worm gear 60 also rotates.

The worm wheel gear 70 is provided to the planar portion 53 of the first nut bracket 52, and simultaneously, fixedly connected to the second end portion of the first door arm 32, and may be in contact with a surface of the worm gear 60 to rotate according to a rotation of the worm gear 60. As the worm wheel gear 70 rotates, the second end portion of the first door arm 32 fixed thereto is rotated to rotate a first end portion of the first door arm 32, rotating the door 10 connected to the first end portion of the first door arm 32.

Meanwhile, the second nut bracket 54 may be provided on a second end portion of the second door arm 34. The second nut bracket 54 may move in the longitudinal direction of the vehicle body 5 according to the rotation of the spindle 20. The same way as in the first nut bracket 52, the second nut bracket 54 may include a planar portion 59 where a lower portion of the second end portion of the door arm 30 is accommodated and a gripping portion surrounding the external circumference of the spindle 20 and configured to move along the spindle 20. However, in another exemplary embodiment of the present invention, the second nut bracket 54 is not provided with the configuration of the worm gear 60 and the worm wheel gear 70, differently from the first nut bracket 52. Furthermore, the gripping portion of the second nut bracket 54 is not provided with an opening.

The second end portion of the second door arm 34 maintains a predetermined interval with respect to the second end portion of the first door arm 32 and may move in the longitudinal direction of the vehicle body 5, together with the second end portion of the first door arm 32. Furthermore, the second door arm 34 may be rotated with the first door arm 32 at the same rotation radius according to a rotation of the first door arm 32.

Referring to FIG. 3 and FIG. 4, when the spindle 20 is rotated by driving of the motor 80, the first nut bracket 52 and the second nut bracket 54 coupled to the external circumference of the spindle 20 linearly move in a longitudinal direction of the spindle 20. Furthermore, the worm gear 60 in contact with the worm wheel gear 70 through the opening 58 of the first nut bracket 52 rotates, and the worm wheel gear 70 in contact with the worm gear 60 is rotated. The second end portion of the first door arm 32 is rotated by a rotation of the worm wheel gear 70, and the door 10 connected to the first end portion of the first door arm 32 and the first end portion of the second door arm 34 rotate by turning of the second end portion of the first door arm 32.

That is, while the spindle 20 rotates, the first nut bracket 52 and the second nut bracket 54 linearly move, and at the same time, and the first door arm 32 and the second door arm 34 rotate by the rotation of the worm gear 60 and the worm wheel gear 70. Accordingly, the door 10 linearly moves and rotates to open the door opening. By the linear movement of the nut bracket 50, rotation radius of the door 10 is decreased, and a protrusion amount toward an external side of the vehicle body 5 may be minimized.

When a driveshaft of the motor 80 is driven in an opposite direction, the spindle 20 rotates in the opposite direction, the first nut bracket 52 and the second nut bracket 54 linearly move in the opposite direction, and at the same time, the worm gear 60 and the worm wheel gear 70 rotate in the opposite direction, closing the door opening.

FIG. 5A, FIG. 5B, FIG. 5C and FIG. 5D are respectively cross-sectional views according to lines D-D, E-E, F-F, and G-G of FIG. 2.

Figure 5A:
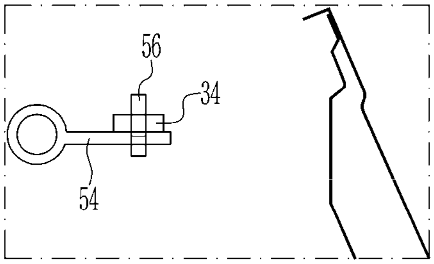
FIG. 5A, FIG. 5B, FIG. 5C and FIG. 5D are respectively cross-sectional views according to lines D-D, E-E, F-F, and G-G of FIG. 2.
Figure 5B:
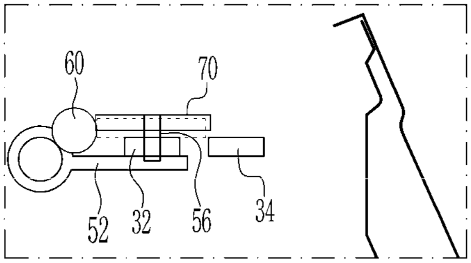

As shown in FIG. 5A, the second end portion of the second door arm 34 may be rotatably hinged to a planar portion 59 of the second nut bracket 54 by the nut pin 56. Furthermore, as shown in FIG. 5B, the second end portion of the first door arm 32 and the worm wheel gear 70 may be coaxially rotatably hinged to the planar portion of the first nut bracket 52 by the nut pin 56. Furthermore, the worm gear 60 may be located between a surface of the spindle 20 and a surface of the worm wheel gear 70, to transfer the torque of the spindle 20 to the worm wheel gear 70.

Figure 5C:
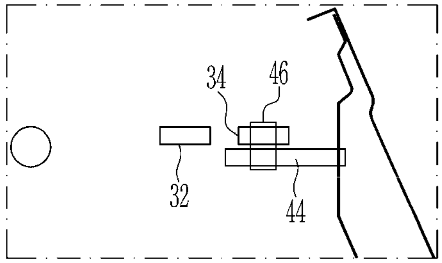
Figure 5D:
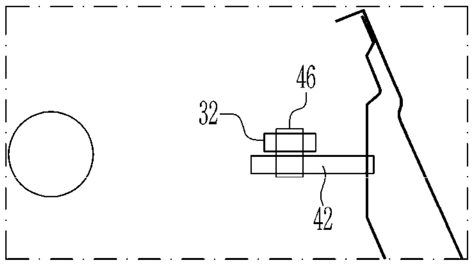

As shown in FIG. 5C, a first end portion of the second door arm 34 may be rotatably hinged to the second door bracket 44 by the door pin 46, and as shown in FIG. 5D, the first end portion of the first door arm 32 may be rotatably hinged to the first door bracket 42 by the door pin 46.

Figure 6:
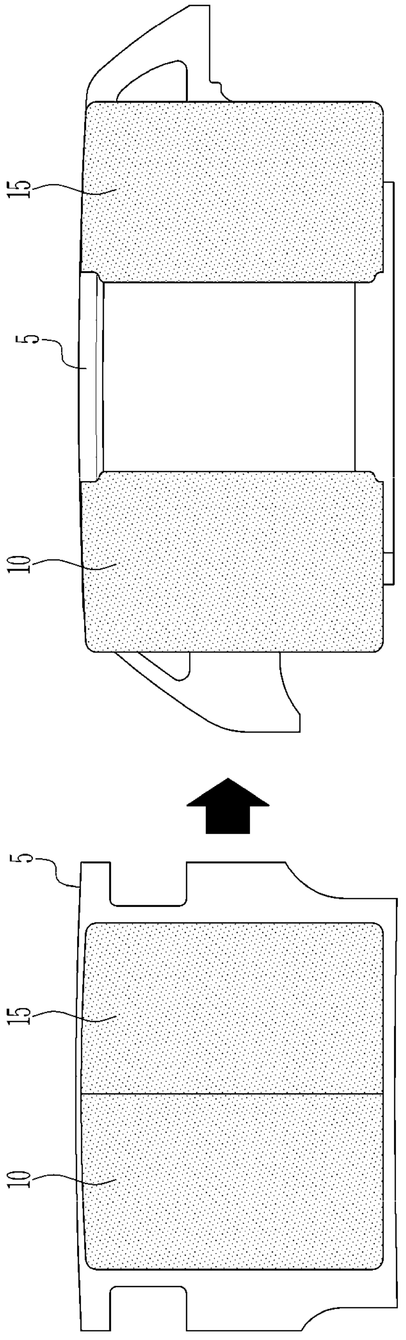
FIG. 6 illustrates closed and opened states of a bidirectional swing door of a vehicle applied with a door opening and closing device for a vehicle according to an exemplary embodiment of the present disclosure, when viewed from the side of the vehicle.
Figure 7:
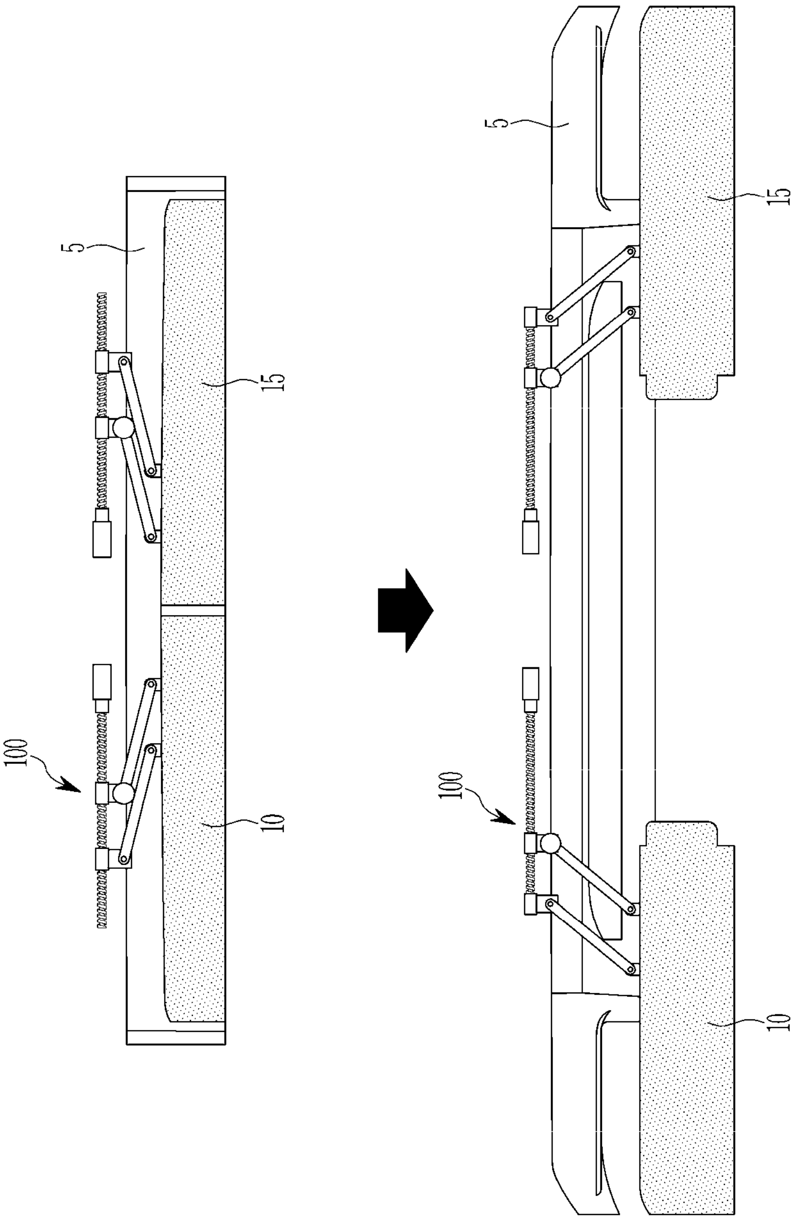
FIG. 7 illustrates closed and opened states of a bidirectional swing door of a vehicle applied with a door opening and closing device for a vehicle according to an exemplary embodiment of the present disclosure, when viewed from above of the vehicle.

FIG. 6 illustrates closed and opened states of a bidirectional swing door of a vehicle applied with the door opening and closing device for a vehicle according to an exemplary embodiment of the present disclosure, when viewed in front of the vehicle. FIG. 7 illustrates closed and opened states of a bidirectional swing door of a vehicle applied with the door opening and closing device for a vehicle according to an exemplary embodiment of the present disclosure, when viewed from above of the vehicle.

As shown in FIG. 6 and FIG. 7, the door opening and closing device for a vehicle according to an exemplary embodiment 100 may be provided to each of a front door 10 and a rear door 15 provided in the front and the rear of the vehicle along the vehicle length direction, and alternatively, may be provided to only one of the front door 10 and the rear door 15. Furthermore, it may be applied to an upper side or a lower side of the door 10, and may be widely applied to a structure of opening and closing the door 10 by sliding movement along the vehicle length direction as well as in the vehicle width direction.

As described above, for changing the closed state of the door 10 to the opened state, when the spindle 20 rotates by the driving of the motor 80, the nut bracket 50 linearly moves forward and rearward in the vehicle length direction, and simultaneously, the worm gear 60 and the worm wheel gear 70 rotate to turn the door arm 30. Therefore, the door 10 simultaneously performs linear and rotational movements to open the door opening. For changing the closed state of the door 10 to the opened state, the driveshaft of the motor 80 may be operated in the opposite direction thereof.

Accordingly, according to an exemplary embodiment of the present disclosure, by employing a door structure opening and closing the door opening by simultaneously performing sliding and rotation, a protrusion amount of the vehicle door toward the outside of the vehicle body may be minimized while maximizing the door opening width, when the door is opened by minimizing a door rotation radius.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door opening and closing apparatus for a vehicle, the apparatus comprising:

a door for opening and closing a door opening formed in a vehicle body;

a spindle mounted on the vehicle body in a longitudinal direction of the vehicle body and configured to rotate; and a door arm including a first end portion rotatably connected to a first end portion of the door, and a second end portion pivotally coupled to the spindle and configured to move along the spindle and rotate according to a rotation of the spindle, wherein the first end portion of the door arm is rotatably connected to a door bracket provided in the door, wherein the second end portion of the door arm is rotatably connected to a nut bracket engaged to the spindle and configured to move along the spindle in the longitudinal direction of the vehicle body according to the rotation of the spindle, wherein the door arm is in plural, wherein the second end portion of at least one of the plurality of door arms is provided with:

a first nut bracket coupled to the spindle and configured to move along the spindle in the longitudinal direction of the vehicle body according to the rotation of the spindle;

a worm gear provided in the first nut bracket and being engaged to the spindle to rotate according to the rotation of the spindle; and a worm wheel gear rotatably mounted on the first nut bracket, connected to the second end portion of the at least one of the door arm, and being engaged to the worm gear to rotate according to a rotation of the worm gear to rotate the second end portion of the at least one of the door arms.

2. The door opening and closing apparatus of claim 1, wherein the first end portion of the door arm is hingedly connected to the door bracket by a door pin, and wherein the second end portion of the door arm is hingedly connected to the nut bracket by a nut pin.

3. The door opening and closing apparatus of claim 2, wherein the plurality of door arms are disposed apart from each other on the spindle in the longitudinal direction of the vehicle body.

4. The door opening and closing apparatus of claim 3, wherein a second end portion of at least one of the door arms is provided with a second nut bracket coupled to the spindle and configured to move along the spindle in the longitudinal direction of the vehicle body according to the rotation of the spindle.

5. The door opening and closing apparatus of claim 2, wherein the door arm includes a first door arm and a second door arm that are disposed apart from and in parallel to each other on the spindle in the longitudinal direction of the vehicle body.

6. The door opening and closing apparatus of claim 5, wherein a second end portion of the first door arm is provided with:

a first nut bracket coupled to the spindle and configured to move along the spindle in the longitudinal direction of the vehicle body according to the rotation of the spindle;

a worm gear provided in the first nut bracket and being engaged to the spindle to rotate according to the rotation of the spindle; and a worm wheel gear rotatably mounted on the first nut bracket, connected to the second end portion of the first door arm, and being engaged to the worm gear to rotate according to a rotation of the worm gear to rotate the second end portion of the first door arm.

7. The door opening and closing apparatus of claim 6, wherein the second end portion of the first door arm is located between the first nut bracket and the worm wheel gear, and wherein the worm gear is located between the spindle and the worm wheel gear.

8. The door opening and closing apparatus of claim 5, wherein a second end portion of the second door arm is provided with a second nut bracket coupled to the spindle and configured to move along the spindle in the longitudinal direction of the vehicle body according to the rotation of the spindle.

9. The door opening and closing apparatus of claim 5, wherein a second end portion of the second door arm maintains a predetermined interval with respect to a second end portion of the first door arm and is configured to move in the longitudinal direction of the vehicle body, and wherein the second door arm is rotated according to a rotation of the first door arm by a same rotation radius with the first door arm.

10. The door opening and closing apparatus of claim 1, wherein the spindle is connected to a center shaft of an actuator provided in the vehicle body and configured to rotate according to driving of the actuator.

11. The door opening and closing apparatus of claim 1, wherein the door includes a front door configured to rotate and linearly move toward a front of the vehicle body, and a rear door configured to rotate and linearly move toward a rear of the vehicle body, and wherein each of the front door and the rear door is provided with the spindle and the door arm.

* * * * *